(12) United States Patent
Bookman et al.

(10) Patent No.: US 9,489,396 B2
(45) Date of Patent: Nov. 8, 2016

(54) INTERMEDIATION OF HYPERVISOR FILE SYSTEM AND STORAGE DEVICE MODELS

(75) Inventors: Peter Bookman, Sandy, UT (US); Chris R. Featherstone, South Jordan, UT (US)

(73) Assignee: V3 SYSTEMS HOLDINGS, INC., Draper, UT (US)

( * ) Notice: Subject to any disclaimer, the term of this patent is extended or adjusted under 35 U.S.C. 154(b) by 769 days.

(21) Appl. No.: 13/175,766

(22) Filed: Jul. 1, 2011

(65) Prior Publication Data

US 2013/0007436 A1    Jan. 3, 2013

(51) Int. Cl.
*G06F 17/30*  (2006.01)
*G06F 3/06*  (2006.01)
*G06F 9/455*  (2006.01)

(52) U.S. Cl.
CPC ....... *G06F 17/30233* (2013.01); *G06F 3/0604* (2013.01); *G06F 3/0638* (2013.01); *G06F 3/0661* (2013.01); *G06F 3/0683* (2013.01); *G06F 9/45533* (2013.01); *G06F 2009/45579* (2013.01)

(58) Field of Classification Search
CPC .......... G06F 3/00; G06F 3/06; G06F 3/0602; G06F 3/067; G06F 3/0661; G06F 17/30182; G06F 17/30312; G06F 17/30321; G06F 17/30091; G06F 17/30238; G06F 17/30914; G06F 2212/7201; G06F 2212/7207; G06F 9/45533; G06F 9/45558; G06F 17/30233; G06F 3/0604; G06F 3/0638; G06F 3/0683
See application file for complete search history.

(56) References Cited

U.S. PATENT DOCUMENTS

| | | | |
|---|---|---|---|
| 8,108,426 B2 | 1/2012 | Arthursson | |
| 2010/0228934 A1* | 9/2010 | Chandrasekaran et al. | 711/162 |
| 2011/0029972 A1 | 2/2011 | Wade | |
| 2011/0145820 A1 | 6/2011 | Pratt | |
| 2011/0314087 A2* | 12/2011 | Golbourn et al. | 709/203 |
| 2012/0239860 A1* | 9/2012 | Atkisson et al. | 711/103 |
| 2012/0278295 A1* | 11/2012 | Hildebrand et al. | 707/705 |

* cited by examiner

*Primary Examiner* — Dennis M Butler
(74) *Attorney, Agent, or Firm* — Miller, Matthias & Hull LLP

(57) ABSTRACT

A communication model in which application(s) above a hypervisor use a file system having one data access model (e.g., a block-based file system) to access an underlying storage device having another data access model (e.g., an object-based file system). This is accomplished via an intermediary component that converts input/output requests and responses from the file system data access model into the underlying storage device data access model, and vice versa. As an example, virtual machines operating a block-based file system using a hypervisor may interface through the intermediary component with an object-based storage device. Thus, the prolific use and availability of block-based file systems may be used compatibly with highly efficient object-based storage devices.

15 Claims, 5 Drawing Sheets

INTERMEDIATION OF HYPERVISOR FILE SYSTEM AND STORAGE DEVICE MODELS

BACKGROUND

Computing systems have transformed the way people work, play, and communicate. Reliable data storage devices are important, if not fundamental, to the operation of a computing system. One of the first data storage devices was a hard disk, which mechanically rotates a physical storage medium in order to read from or write to the hard disk. Such traditional hard disks had a block-based interface, in which the data on the hard disk is organized into fixed sized blocks of data. The hard disk also included an index to assist the file system in finding the blocks. During runtime, the index is loaded into the computing system's memory. Due to the size of the index, the memory can often only contain a portion of the index at any given time.

Traditional file systems are also block-based. For instance, the file system receives file commands from the application(s) running on the computing system. The file system maps the files to one or more blocks, and then the index loaded from the block-based disk is used to complete the corresponding block read and write requests needed to satisfy the higher-level file request received by the file system. In more modern times, other types of modern storage media are available. Such modern storage media may often be solid-state, such as NAND flash memory chips. Regardless, such modern storage media often still takes the historical block-based approach, using block-based file systems that interface using block-based commands. Examples of block-based file systems include the File Allocation Table (FAT) file system and the New Technology File System (NTFS). The NTFS file system is in widespread use.

More recently, object-based storage devices (sometimes referred to in the art as an "OSD") have been developed. Such object-based storage devices contain data structures called "objects" that are variable-sized data-storage containers. Each object includes data and properties. The data is consumable by the entity (e.g., the application) requesting the objects. The properties include an object identifier, attributes, and metadata. The object-based storage device provides its own mechanism for allocating and placement of storage for the objects, rather than rely on a file system. Furthermore, the object-based storage device does not use a memory-intensive index to track objects. Rather than being a flat list of fixed-sized memory locations, as is the case with block-based storage, the objects in an object-based storage device may be any size, and may be interrelated, and perhaps hierarchically structured, with related objects perhaps being distributed across multiple object-based storage devices. Such distributed object hierarchies are enabled by keeping the metadata for each object local to the application that accesses the hierarchy, while allowing the data itself to be distributed.

Object-based file systems have the capability to interface with object-based storage devices by communicating using an appropriate object-based interface standard recognized by both the file system and the storage devices. There are flexible object-based interface standards now available for interfacing with such object-based storage devices. One standard is the ANSI T10 SCSI OSD standard.

Thus, object-based file systems may interact with object-based storage devices to provide a robust and flexible object-based data model to the application. Some object-based file systems are also capable of interfacing with block-based storage devices. In that case, objects are mapped to particular blocks of memory, and the object-based file system uses that mapping to access appropriate blocks of memory corresponding to a desired object to be accessed.

BRIEF SUMMARY

At least one embodiment described herein relates to the use of a hypervisor to allow a file system that has one data access model to interface with an underlying storage device that follows another data access model through a hypervisor. In one embodiment, in the direction from the hypervisor to the underlying storage device, the hypervisor provides a set of input/output request(s) in a first format, which is converted in software into a set of input/output request(s) that is in a second format. The latter set of input/output request(s) may then be provided to the underlying storage device which understands the second format. For instance, in one embodiment, the hypervisor may support one or more virtual machines that use a block-based file system. The block input/output request(s) are converted into object input/output requests compatible with an object-based storage device. This allows access requests to be submitted by a block-based file system to an object-based storage device, without requiring the file system itself understand the object access model.

In one embodiment, in the direction from the underlying storage device to the hypervisor, the underlying storage device provides a set of input/output responses(s) in the second format, which is converted in software into a set of input/output response(s) that is in the first format. The latter set of input/output response(s) may then be provided to the hypervisor which understands the first format. For instance, in one embodiment, the underlying storage device may provide object input/output responses, which are then converted into block input/output response(s), which are then provided to the hypervisor.

In the more specific embodiment, from the viewpoint of the virtual machine operating above the hypervisor, the virtual machine is operating a block-based file system, while really the underlying storage device is an object-based storage device. Thus, the prolific use and availability of block-based file systems may be used compatibly with highly efficient object-based storage devices. From a more general perspective, applications running on a hypervisor may interface with an underlying storage device without using a file system that follows the format and interface standards of that underlying storage device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a communication intermediation technique is described in which application(s) above a hypervisor use a file system having one data access model (e.g., a block-based file system) to access an underlying storage device having another data access model (e.g., an object-based file system). This is accomplished via an intermediary component that converts input/output requests and responses from the file system data access model into the underlying storage device data access model, and vice versa. As an example, virtual machines operating a block-based file system using a hypervisor may interface through the intermediary component with an object-based storage device. Thus, the prolific use and availability of block-based file systems may be used compatibly with highly efficient object-based storage devices. First, some introductory discussion regarding computing systems will be described with respect to FIG. 1. Then, the embodiments of the communication intermediation will be described with respect to FIGS. 2 through 4. The operation of multiple instances of the environment of FIG. 2 will then be described with respect to FIG. 5.

Figure 1:
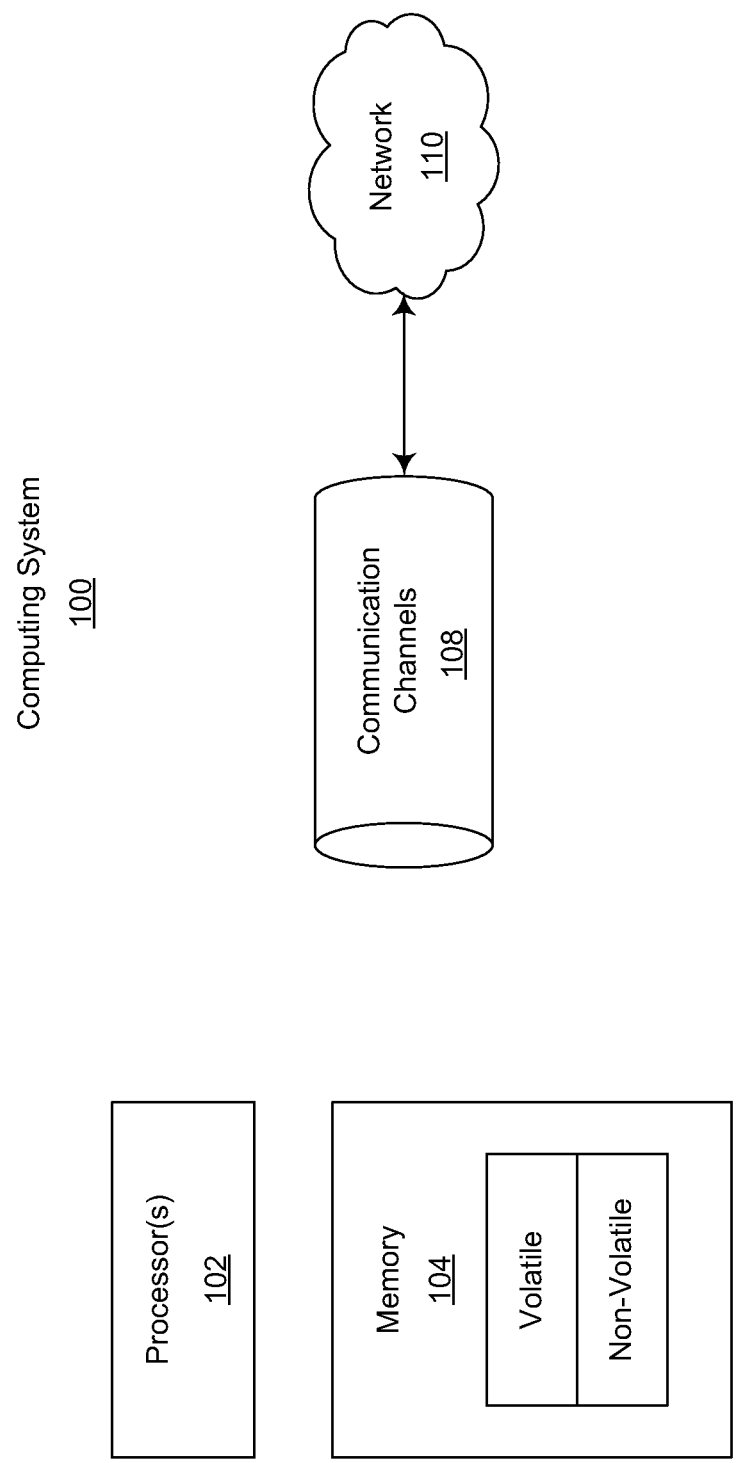
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
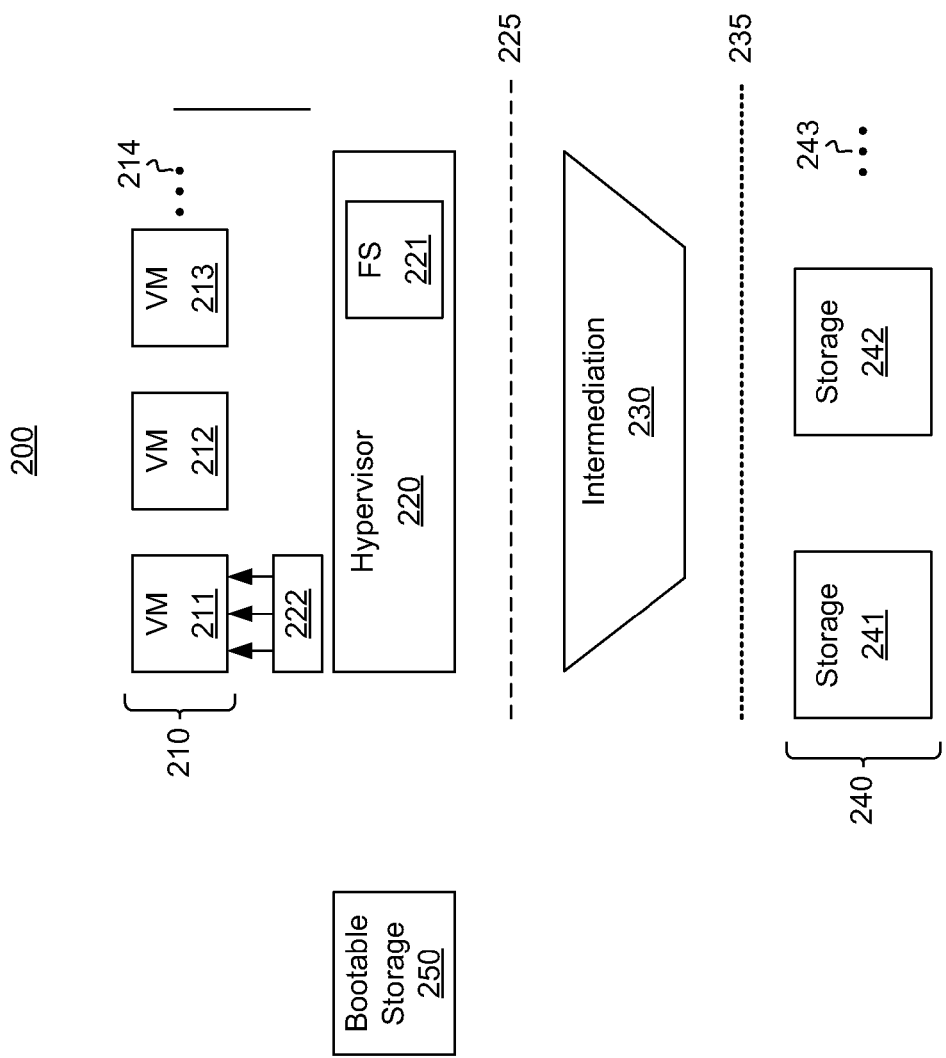
FIG. 2 illustrates an environment in which a plurality of virtual machines communicate through a hypervisor using an input/output interface that is converted to another input/output interface that is compatible with an underlying storage device.

FIG. 2 illustrates an environment 200 in which a set of virtual machines 210 interface indirectly with a set of underlying storage devices 240. There may be any number of virtual machines 210. In FIG. 2, there are three virtual machines 211, 212 and 213 shown, with ellipses 214 representing that the number of virtual machines 210 from as few as one, but potentially many thousands, or even more. Thus, the environment 200 may be a centralized location that manages many virtual machines. Each virtual machine manages state from a corresponding client that may perhaps be remotely located. The virtual machine provides an image representing a desktop image to the corresponding client, and alters the image in response to detected events, such as, for example, a user interfacing with the current desktop image.

As the client interacts with the displayed desktop image corresponding to a virtual machine, that client input is transmitted to the centralized environment 200. The corresponding virtual machine interprets the client input, and processes the client input. In response to this input, or in response to some other detected event, the virtual machine changes the state of the virtual desktop if appropriate. If this changed state results in a change in how the desktop appears, the virtual machine constructs and transmits another desktop image to the client. From the user's perspective, this occurs often fast enough that the displayed desktop is substantially immediately responsive to the user input. This is especially true using the principles of the present invention described herein in which data access can be made quite fast.

The virtual machines 210 interact with a hypervisor 220 that essentially services as the operating system for the virtual machines 210. The hypervisor 220 abstracts away the actual hardware of the environment 200 from the virtual machines 210. For instance, the hypervisor 220, amongst other functions, provides a file system 221 for the virtual machines.

The hypervisor file system 221 does not provide input/output requests in the format that is compatible with the interface 235 of the underlying storage devices 240. Rather, the hypervisor file system 221 provides input/output requests that are compatible with another interface 225. As an example, the hypervisor file system 221 may provide input/output requests in block format as it would if interfacing with a block-based storage device. File systems that interface with block-based storage devices are often referred to as block-based file systems. An example of a hypervisor file system that may perform block-based input/output requests is the File Allocation Table (FAT) and the New Technology File System (NTFS).

An intermediation component 230 converts input/output requests that are compatible with the interface 225 into input/output requests that are compatible with the interface 235 so that the requested data access may be accomplished with the underlying data storage devices. In one embodiment, the interface 235 is an object-based interface and the underlying storage devices 240 are object-based storage devices. In that case, an example of the interface 235 might be the ANSI T10 SCSI OSD standard, although the principles described herein are not limited to the interface 235 being that standard, nor limited to the interface 235 even being an object-based interface at all. Intermediation components that convert between block-based interfaces and object-based interfaces are commercially available. The intermediation component 230 may include firmware and/or software that allows it to perform the intermediation.

Object-based storage devices (sometimes referred to in the art as an "OSD") contain data structures called "objects" that are variable-sized data-storage containers. Each object includes data and properties. The data is consumable by the entity (e.g., the application) requesting the objects. The properties include an object identifier, attributes, and metadata. The object-based storage device provides its own mechanism for allocating and placement of storage for the objects, rather than rely on a file system. Furthermore, the object-based storage device does not use a memory-intensive index to track objects. Rather than being a flat list of fixed-sized memory locations as is the case with block-based storage, the objects in an object-based storage device may be any size, and may be interrelated, and perhaps hierarchically structured, with related objects perhaps being distributed across multiple object-based storage devices. Such distributed object hierarchies are enabled by keeping the metadata for each object local to the application that accesses the hierarchy, while allowing the data itself to be distributed.

In the illustration of FIG. 2, the storage devices 240 include two storage devices 241 and 242. However, the ellipses 243 represent that there may be any number of storage devices that may be accessed through the interface 235. In fact, if the interface 235 were an object-based interface that permitted the underlying storage devices 240 to contain distributed objects, the underlying storage devices 241 may likewise be distributed. The principles described herein are not limited to the physical structure of the storage devices 240. For instance, the storage devices may include disk storage, solid-state storage or any other mechanism for storing data. Solid-state storage, however, allows rapid data access speeds.

The environment 200 also includes a bootable storage device 250. In one embodiment, the virtual machines 210, the hypervisor 220 and the intermediation component 230 reside on a single server machine, with perhaps one or more or all of the storage devices 240 also being located on that same server machine, or at least within a common trusted cluster of servers. FIG. 1 describes a computing system 100 that may serve as a broad example of the server machine.

The bootable storage device 250 contains low-level executable code that is automatically executed upon powering up the server machine. Upon completion of execution of the bootable code, the hypervisor 220 and intermediation component 230 (which may be software programs) are executed. Subsequently, as each virtual machine is instantiated, the virtual machine may use the hypervisor 220 to provide access to bootable code. The bootable storage device 250 may be accessed through a network, but is preferably a storage device that is available locally on the server machine.

In some embodiments, the storage devices may have their own processing capability and export callable functions. For instance, conventional commercially available object-based storage often exports particular functions that may be called by software components. Example of such functions includes status functions that permit certain current status of the storage device to be queried. For instance, the storage device may be queried to verify which virtual machine is currently writing to and/or reading from the storage device. Another example of a function might be for the object-based storage device to emulate a conventional block-based disk using RAID (which originally was an acronym for Redundent Array of Inexpensive Disks) technology. Again, each model of storage device may offer a set of functions, some or all of which being unique to that model.

However, to call such particular functions often requires administrator rights. To allow for scaling such that a large number of virtual machines can operate in the environment 200, a few, and preferably only one, of the virtual machines is provided with administrator rights, and is loaded with an agent framework 222 that operates to place function calls directly into the storage device. For instance, VMWare currently offers a product in which a root virtual machine (as an example, virtual machine 211) may be provided with administrative rights. The agent framework 222 may be loaded into the root virtual machine 211 to thereby allow the root virtual machine 211 access to the model-specific storage device functions.

For instance, as a first method example, the agent framework 222 may be configured to query the storage device (e.g., an object-based storage device) for status information using functions offered by the corresponding storage device. As an example, the agent framework may query as to how much data is being written to and/or read from the storage device in a given time period, the current temperature of the storage device, what the current performance parameters are of the storage device, and so forth.

As a second method example, the agent framework 222 may also format the storage device using storage-specific functions. For instance, depending on the intended usage of the storage device, the storage device may be formatted with certain block sizes.

As a third method example, the agent framework 222 may provide firmware updates to the storage device again using storage-specific firmware upgrade functions.

As a fourth method example, the agent framework 222 may be used to get the physical erase block map for the storage device. This may be used to determine whether a storage device has any bad sectors, for example.

As a fifth method example, the agent framework 222 may be used to get the logical erase block map for the storage device.

The methods offered by the agent framework 222 may depend on the specific functionality offered by the underlying storage device. Thus, as the environment 200 is expanded to include additional models of storage devices, the agent framework 222 may also have additional methods that take advantage of the extended functionality of those new models of storage devices.

The agent framework 222 may also report to management logic (e.g., a connection broker) regarding particular parameters of the environment 200 as described with respect to FIG. 5 below, after the description of the operation of the environment 200 with respect to FIGS. 3 and 4.

Figure 3:
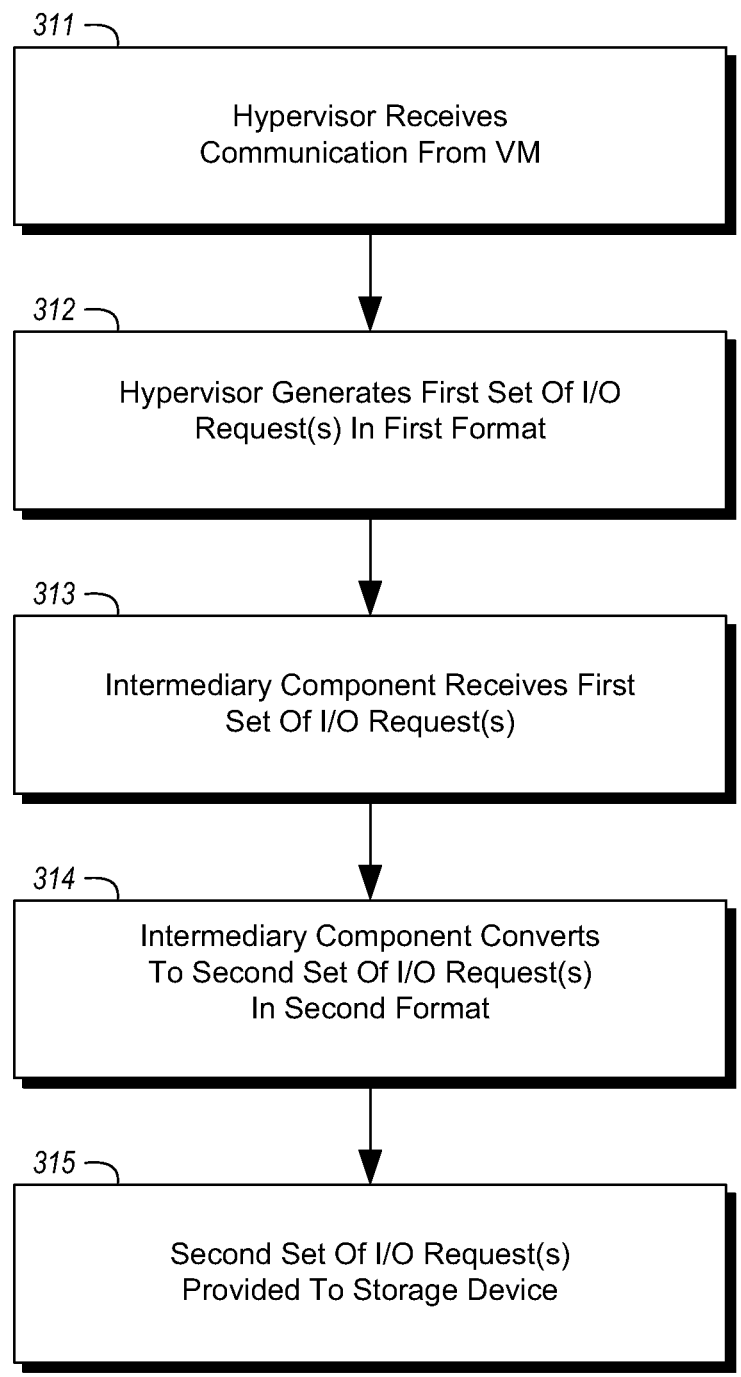
FIG. 3 illustrates a flowchart of a method for one of the virtual machines to submit an input/output request to the underlying data storage device through an abstracting hypervisor in the environment of FIG. 2.

FIG. 3 illustrates a flowchart of a method 300 for the virtual machine(s) 210 to write to the storage device(s) 240. The hypervisor receives a file access request or other communication from one or the virtual machines 210 (say virtual machine 211) that operates using a file-based operating system (act 311). The hypervisor file system 221 then converts the file access request into the first set of one or more input/output requests in a first format (act 312). As an example, the first format may be block-based input/output requests in which block-based requests are provided through the interface 225 to the intermediation component 230.

The intermediation component 230 receives these input/output request(s) (act 313) and converts them into a second set of one or more input/output requests that are that is compatible with an underlying storage device (act 314). For instance, the intermediation component 230 of FIG. 3 converts the block-level input/output requests that are compatible with block-based storage devices into object-based input/output requests that are compatible with underlying object-based storage devices. The intermediation component 230 then causes the second set of input/output request(s) to be provided through the interface 235 to the appropriate underlying storage device (act 315).

Figure 4:
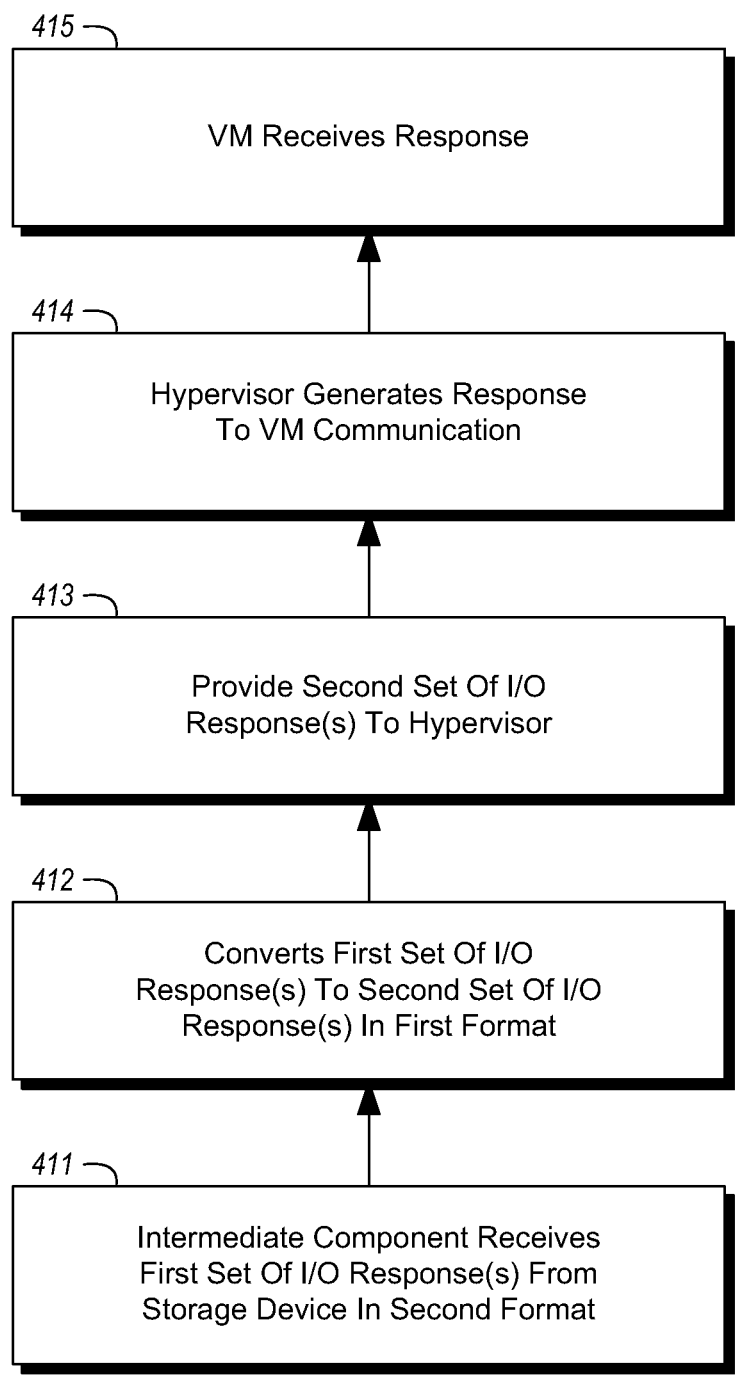
FIG. 4 illustrates a flowchart of a method for a resulting read from the underlying storage device to be provided to the virtual machine through the abstracting hypervisor.

FIG. 4 illustrates a flowchart of a method 400 for the storage device 240 to read to the virtual machine 210. Here, the process essentially is the reverse of that in FIG. 3, and is illustrated in FIG. 4 leading from the bottom to the top of the figure. The intermediary component receives a first set of one or more input/output response(s) from the underlying storage device (act 411). For instance, these responses may be in response to the second set of input/output request(s) made through the interface 235 by the intermediary component 230 to the storage device 241. The first set of input/output responses is likewise provided through the interface 235. As an example, again, the first set of input/output response(s) may be compatible with an object-based interface.

The intermediary component 230 converts the first set of input/output response(s) in the second format to a second set of one or more input/output response(s) in the first format (at 412). In the specific block/object example, the first format may be a block format, and may be similar to the response that would be received from a block-based storage device. In that case, the second set of one or more input/output response(s) may be block-based responses.

The second set of one or more input/output response(s) are then provided by the intermediary component 230 to the hypervisor 220 through the interface 225 (act 413). The file system 221 then converts the second set of one or more input/output response(s) (e.g., the read blocks) into a file access response (act 414) (i.e., the actual file requested by the virtual machine 211). The file access response is then provided to the virtual machine (act 415).

Figure 5:
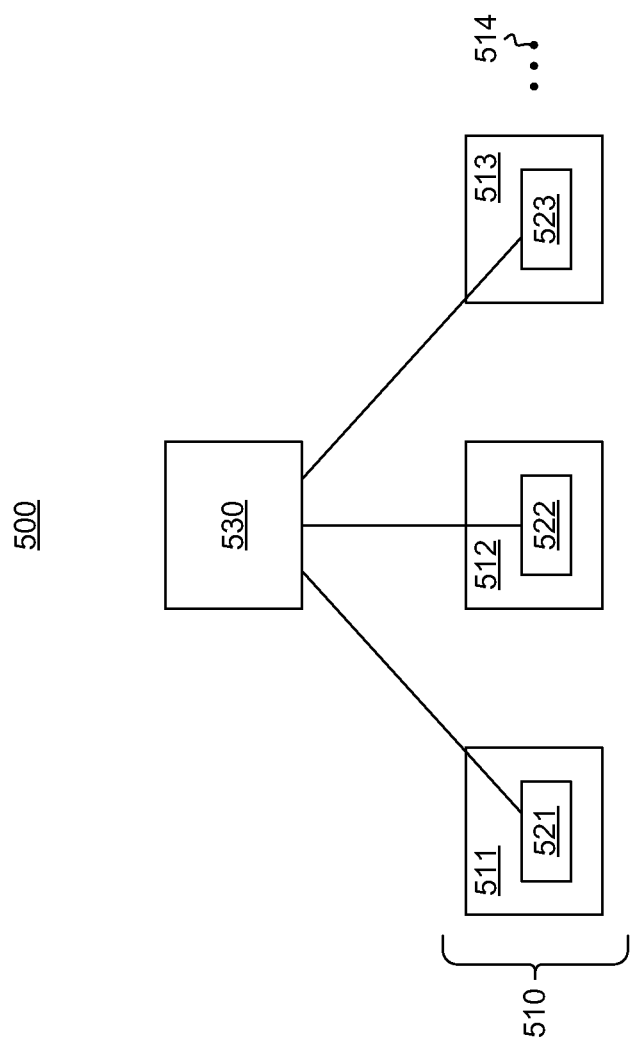
FIG. 5 illustrates a network environment that includes multiple instances of the environment of FIGS. 2 that are all served by a connection broker.

FIG. 5 illustrates a network environment 500 that includes multiple instances 510 of the environment 200 of FIG. 2. In FIG. 5, there are three instances 511, 512 and 513 of the environment of FIG. 2, although the ellipses 514 represent that there may be more of such environments. Each instance 510 is represented abstractly in that only the agent framework is shown for each instance 510, though each instance may indeed be structured as illustrated and described with respect to FIG. 2. In FIG. 5, the agent framework 521 is running on the environment 511, agent framework 522 is running on the environment 512, agent framework 523 is running on the environment 513, and so forth. Each agent framework may perform the functions described for the agent framework 222 of FIG. 2. In one embodiment, each of the environments 510 may be a single physical host. In that case, there may be one agent framework running on each host.

As previously mentioned, the agent framework may perform management functions for the corresponding host. For instance, the agent framework may report to a management component 530 regarding performance parameters of the corresponding host. The management component 530 may monitor the performance for multiple hosts, and perform load balancing accordingly. For instance, the management component 530 may include connection broker functionality that connects each connection request from a client to a corresponding host, or in particular, perhaps to a corresponding virtual machine.

The principles described herein thus permit a mechanism for a file system that communicates using one data access model with an underlying storage device that communicates using a different data access model. In one example, the file system may be a file system that does not follow an object-based data access model, which using the principles described herein, may now utilize an object-based data model. In a specific example, virtual machines operating a block-based file system may now access an object-based storage device using the principles described herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising at least one computer storage medium having thereon computer-executable instructions, when executed by at least one processor of a computing system, cause the computing system to perform a method for intermediating data between a hypervisor and an underlying storage device, the method comprising:
receiving a first set of at least one input/output request in a first format from the hypervisor;
converting the first set of at least one input/output request in a first format to a second set of at least one input/output request in a second format that is compatible with the underlying storage device, wherein the second set of at least one input/output request in the second format is a set of at least one object input/output request in an object format; and
providing the second set of at least one input/output request to the underlying storage device.

2. The computer program product in accordance with claim 1, wherein the first set of at least one input/output request in a first format is a set of at least one block input/output request in a block format.

3. The computer program product in accordance with claim 1, wherein converting the first set of at least one input/output request in a first format to the set of at least one object input/output requests in the object format comprises constructing a metadata access operation in the object format.

4. The computer program product in accordance with claim 1, wherein the underlying storage device is an object-based storage device.

5. The computer program product in accordance with claim 1, wherein the underlying storage device is a solid-state storage device.

6. The computer program product in accordance with claim 1, wherein the method further comprises operating the hypervisor, the hypervisor being configured to receive a file access request from a file-based operating system and to convert the file access request into the first set of at least one input/output requests in a first format.

7. The computer program product in accordance with claim 6, wherein the file-based operating system supports at least one virtual machine.

8. The computer program product in accordance with claim 6, wherein the file-based operating system supports a plurality of virtual machines.

9. The computer program product in accordance with claim 1, wherein the method further comprises:
receiving a first set of at least one input/output response to the second set of at least one input/output request from the underlying storage device, the first set of at least one input/output response being in the second format;
converting the first set of at least one input/output response in the second format to a second set of at least one input/output response in the first format; and
providing the second set of at least one input/output response to the hypervisor.

10. The computer program product in accordance with claim 1, wherein the hypervisor is constructed by booting from a bootable storage device.

11. A computer program product comprising at least one computer storage medium having thereon computer-executable instructions that, when executed by at least one processor of a computing system, cause the computing system to perform a method for intermediating data between an underlying storage device and a hypervisor, the method comprising:
receiving a first set of at least one input/output response from an underlying storage device, the first set of at least one input/output response being in the a second format, wherein the first set of at least one input/output response in the second format is a set of at least one object input/output response in an object format;
converting the first set of at least one input/output response in the second format to a second set of at least one input/output response in a second first format; and
providing the second set of at least one input/output response to the hypervisor.

12. The computer program product in accordance with claim 11, wherein the second set of at least one input/output response in the first format is a set of at least one object input/output response in an object format.

13. The computer program product in accordance with claim 12, wherein the method further comprises operating the hypervisor, the hypervisor being configured to convert the second set of at least one input/output response in the first format into a file access response and to provide the file access response to a file-based operating system.

14. The computer program product in accordance with claim 13, wherein the file-based operating system supports at least one virtual machine.

15. The computer program product in accordance with claim 11, wherein the hypervisor is constructed by booting from a bootable storage device.

* * * * *